United States Patent [19]

Scott

[11] Patent Number: 5,406,737
[45] Date of Patent: Apr. 18, 1995

[54] DOWNRIGGER WIRE ELECTRICAL POTENTIAL CONTROLLING APPARATUS AND METHOD

[75] Inventor: Blayney J. Scott, Victoria, Canada

[73] Assignee: Scott Plastics Ltd., Victoria, Canada

[21] Appl. No.: 190,939

[22] Filed: Feb. 3, 1994

[51] Int. Cl.⁶ ............................................. A01K 91/08
[52] U.S. Cl. ......................................... 43/27.4; 43/4.5
[58] Field of Search ..................... 43/27.4, 26.1, 27.4, 43/44.98, 4, 4.5

[56] References Cited

U.S. PATENT DOCUMENTS 3,363,354  1/1968  Riemer ................................... 43/4.5
4,215,505  8/1980  Henze et al. ........................... 43/27.4

OTHER PUBLICATIONS

Electrical Fields "Alaska Fisherman's Journal" Feb. 1994.

*Primary Examiner*—P. Austin Bradley
*Assistant Examiner*—Jeanne M. Elpel
*Attorney, Agent, or Firm*—Bull, Housser & Tupper

[57] ABSTRACT

The invention is for controlling electrical potential of a downrigger wire line as used in downrigger fishing. The apparatus has a conducting member with an opening to receive the downrigger wire line to permit the wire line to pass freely therethrough. The conducting member has at least a contact portion which is electrically conducting and which contacts the downrigger wire line to provide electrical contact therewith. The contact portion is electrically connectable to an electrical voltage source to provide an electrical potential to the downrigger wire line. A main electrical conductor connected to the contact portion is also preferably connected to a portion of the downrigger so as to partially locate the conducting member which is also partially supported on the downrigger wire line. Preferably, the conducting member is a sleeve which at least partially encloses the downrigger wire line. Thus, an accurately controlled electrical potential is transferred directly into the wire line, without passing through intermediate portions of the downrigger apparatus. This permits control of electrical potential of a downrigger wire line of a recreational downrigger, in which the wire line is commonly wound on an insulating plastic reel or spool and passes through an insulating plastic pulley at an end of the downrigger arm.

21 Claims, 3 Drawing Sheets

DOWNRIGGER WIRE ELECTRICAL POTENTIAL CONTROLLING APPARATUS AND METHOD

BACKGROUND OF THE INVENTION

The invention relates to an apparatus and method for use with controlling electrical potential of a downrigger wire line as used in fishing, in particular for relatively small downriggers as used by recreational fisherman.

It is well known that fish prefer to inhabit waters within specific preferred temperature ranges, and commonly water of the preferred temperature range is relatively deep, sometimes several hundred feet below the surface. In order to maintain a hook and a lure at that depth when trolling or mooching, a downrigger is commonly used, a typical downrigger being shown in patents of the present applicant, for example U.S. Pat. Nos. 4,044,968 issued August, 1977 and 4,932,602 issued June, 1990. It is not unusual for a small recreational fishing vessel to have two or more downriggers extending from different locations on its deck. Each downrigger has a heavy weight carried on a thin stainless steel wire line, the wire line being wound on a spool or reel. At least one fishing line with a lure and hook is releasably attached to the wire line using a downrigger release clip, which releases the fishing line from the downrigger wire line when the hook is taken by the fish. Downriggers are fitted with depth indicators for indicating length of the wire line extending from the reel, and thus if the length of unwound wire line is known, and the approximate depth of the weight is known, the approximate depth of the fishing lure will also be known.

Commercial trollers use more complex fishing gear, commonly called "gurdies", which use weighted lines to position fishing lures and hooks at known depths, but eliminate the release hooks of the recreational fisherman's downrigger. The gurdies have multiple reels to control multiple wire lines and associated weights, and a complex system of booms and pulleys are used to reduce the chance of the inadvertent fouling between adjacent fishing lines, wire lines, and weights.

It is well known that fish react to weak positive and negative electrical charges or fields in water, and it appears that some fish are attracted to a positive charge and are repelled by a negative charge. Attraction by the positive voltage charge is difficult to quantify, but even if the fish are not attracted by the positive charge, they are at least not repelled to the extent that they are repelled by a negative charge. Some fish showing the most sensitivity include salmon and trout, which are some of the most popular species of fish which recreational fisherman try to catch. If the downrigger is electrically insulated from the boat, a "natural" electrolysis between the stainless steel downrigger wire line and certain other dissimilar metals of the boat immersed in the water, e.g. a sacrificial zinc or aluminium anode, will create a natural positive voltage or charge around the downrigger wire line which can assist in attracting fish.

Commercial salmon trollers use an electrical potential controlling apparatus which accurately controls a resulting positive voltage on the wire lines associated with the gurdies. Because commercial fishermen use many wire lines, each wire line can be connected to the apparatus to create a complete zone of positive electrical potential around the boat. The electrical potential controlling apparatus used by commercial fishermen is sufficiently flexible and powerful to control voltage or potential of a few or many wire lines, and thus is unnecessarily complex and powerful for recreational fishermen who may use between one and four wire lines. Commercial fishermen usually wind the wire lines of the gurdies onto metal reels which are journalled on metal shafts mounted in housings on the vessel. It is usual to control the electrical potential on the wire lines by connecting an electrical cable to apply a positive DC voltage to electrically conducting structure associated with the gurdies, for example the axle or shaft mounting the reels, or the housings journalling the shaft. To use the apparatus correctly, the shafts and housings of the gurdies are insulated from the vessel.

In contrast, many downriggers used by recreational fisherman have plastic spools or reels, and consequently wire line carried on the downrigger reels cannot be electrically charged by connecting an electrical conductor to the reel axle. In addition, the wire line passes over a downrigger pulley which is also commonly made from plastic, and thus also insulates the wire line. Because of the difficulty of conducting electricity to the wire of the recreational downrigger, it has not been common practice to control electrical potential on downrigger wire lines of recreational fishermen's downriggers.

SUMMARY OF THE INVENTION

The invention reduces the difficulties and disadvantages of the prior art by providing a simple means of conducting electricity to a downrigger wire line extending from an electrically insulated reel or spool of a recreational fisherman's downrigger. The apparatus is simple and can be easily fitted to essentially any conventional downrigger having a plastic reel and pulley, or a reel and pulley that are otherwise insulated from the wire or surrounding portions of the downrigger apparatus. In addition, the invention provides a simplified, relatively less powerful and lower cost electrical potential controlling apparatus than that used by the commercial fishermen.

An apparatus according to the invention is for controlling electrical potential of a downrigger wire line and comprises a conducting member having an opening to receive the downrigger wire line to permit the wire to pass freely therethrough. The conducting member has at least a contact portion which is electrically conducting and which contacts the downrigger wire line to provide electrical contact therewith. The contact portion is electrically connectable to an electrical voltage source to provide an electrical potential to the downrigger wire line. A releasable electrical conductor connecting means is connected to the contact portion of the conducting member to receive an electrical conductor to provide the electrical charge. Preferably, the conducting member is made from electrically conducting material and is a sleeve having an axially elongated side wall which at least partially encloses the downrigger wire line. The sleeve has a side wall which flares outwardly at ends thereof to smoothly guide the downrigger wire line therethrough in either direction.

A method according to the invention is for controlling electrical potential of a downrigger wire line and comprises the steps of:
 passing the downrigger wire line through a conducting member having an opening to receive the downrigger wire line to pass freely therethrough, maintaining electrical contact between a contact portion of the conducting member and the downrigger wire line as the wire passes therethrough, and exposing the contact portion of the guide member to an electrical voltage to control electrical potential of the downrigger wire line. Preferably, the conducting member is provided with an axially elongated side wall to define a sleeve which at least partially encloses the downrigger wire line. The downrigger wire line passes through an end of the sleeve which is flared outwardly so as to ensure smooth passage of the wire through the sleeve.

A detailed disclosure following, related to drawings, describes a preferred apparatus and method according to the invention, the apparatus and method being capable of expression in structure other than those particularly described and illustrated.

DETAILED DESCRIPTION

FIG. 1

Figure 1:
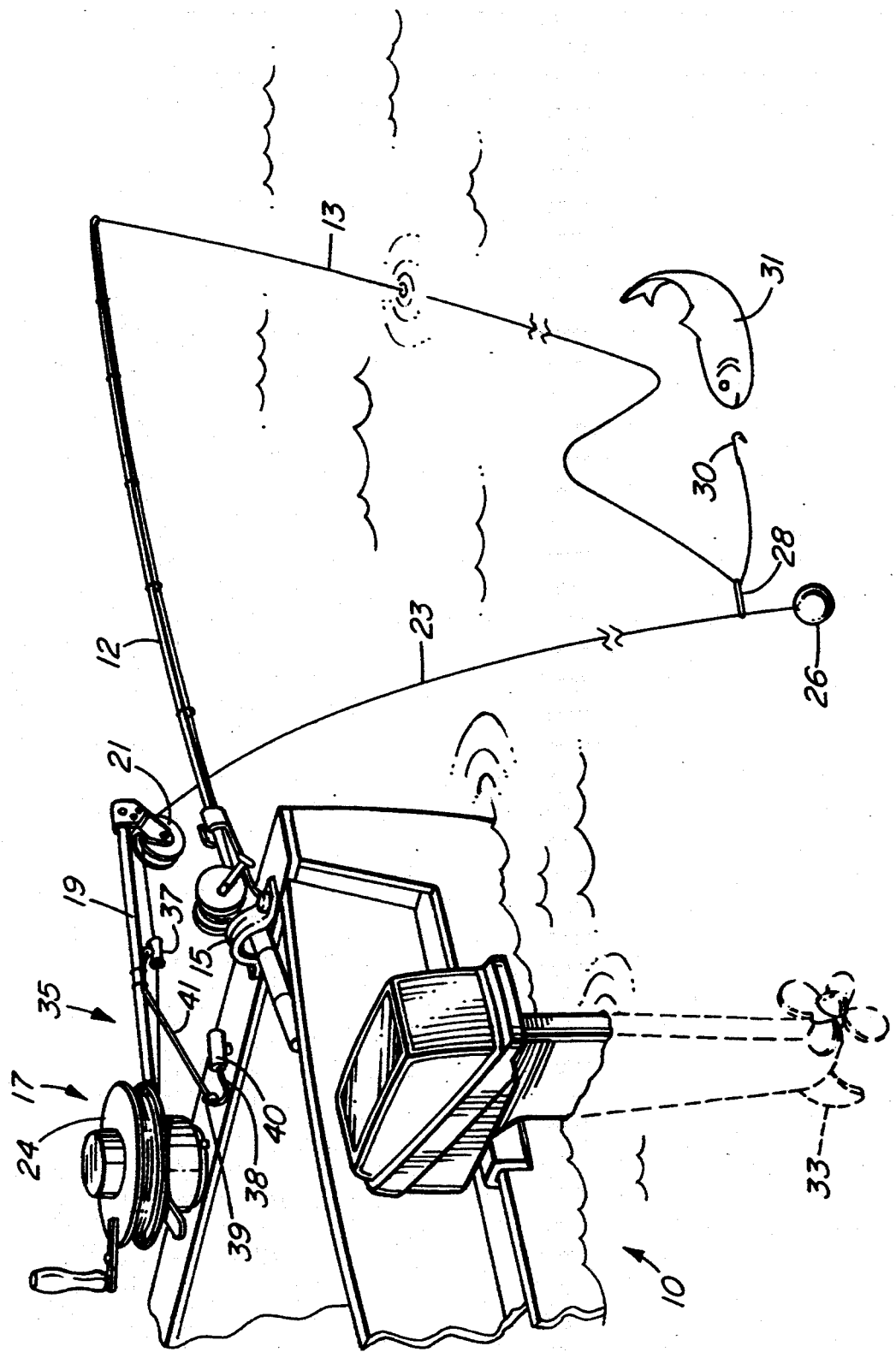
FIG. 1 is a simplified fragmented view of a stern portion of a boat equipped with fishing apparatus, and a downrigger wire line electrical potential controlling apparatus according to the invention.

A stern 10 of a recreational fishing vessel carries a fishing rod 12 having a fishing line 13, the rod being mounted on a rod holder 15 secured to the vessel. The vessel also carries a downrigger apparatus 17 having a downrigger support arm 19 carrying a pulley 21 at an outer end. A downrigger wire line 23 extends from a rotatable spool or reel 24 to an outer end of the wire carrying a weight 26. The wire line 23 is preferably a very light stainless steel multistrand cable adapted to support the weight 26, which typically can be between about 10 and 20 pounds (about 5 to 10 kg). A downrigger release clip 28 is carried on the wire line 23 a short distance above the weight 26, and releasably retains a lower portion of the fishing line 13 which is generally adjacent a lure and hook 30. When a fish 31 strikes at the lure or hook with sufficient force to take the hook, the clip 28 releases and the line 13 is then free from the downrigger, permitting the to fisherman to "play" the fish in the normal manner.

The above description describes a conventional downrigger set-up for normal recreational fishing. Usually, the reel 24 and pulley 21 are made of plastic, and thus are electrically insulating and insulate the wire line 23 from the vessel. A natural electrolysis occurs between the stainless steel downrigger wire line and certain other dissimilar metals of the boat immersed in boat, e.g. a sacrificial anode 33 made of zinc, aluminium, etc. This electrolysis creates a positive electrical potential charge around the downrigger wire line, but the electrical potential is usually not at a voltage to attract the desired species of fish. Similarly to a commercial fisherman's trolling gear, electrical potential difference between the wire line 23 and the dissimilar metal should be controlled accurately, but because the plastic reel and pulley insulate the wire line, the commercial fisherman's electrical potential controlling apparatus cannot be used. Instead, to overcome the electrical insulation inherent with use of a plastic reel and pulley, an electrical potential controlling apparatus 35 according to the invention is used.

The electrical potential controlling apparatus 35 according to the invention comprises a conducting member 37 which is to be described with reference to FIGS. 2 through 4, and a voltage control apparatus or electrical potential controller 40 having a circuit which will be described with reference to FIG. 5. A main electrical wire 41 extends between the conducting member 37 and a electrical terminal 39 which is connected to an output wire 38 extending from the apparatus 40. Thus, the main electrical wire 41 serves as a main electrical conductor to apply an accurately controlled voltage to the conducting member. The downrigger wire line 23 is in electrical contact with the conducting member and thus receives the voltage applied to the conducting member to generate a low voltage field around the wire line 23. The electrical terminal 39 can be used to connect other main electrical wires, not shown in FIG. 1, to supply electrical potential to other conducting members for other downriggers as will be described.

Figure 2:
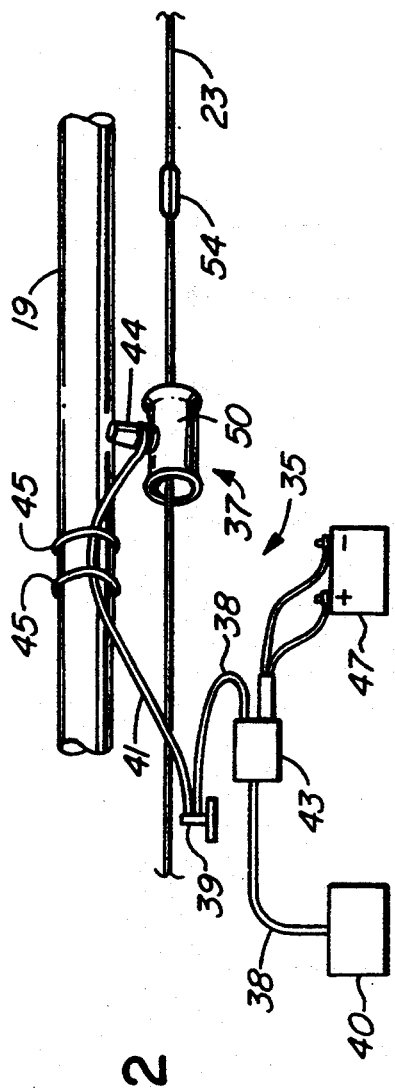
FIG. 2 is a view generally similar to FIG. 1 but at an enlarged scale showing a conducting member according to the invention connected to the potential controlling apparatus.
Figure 4:
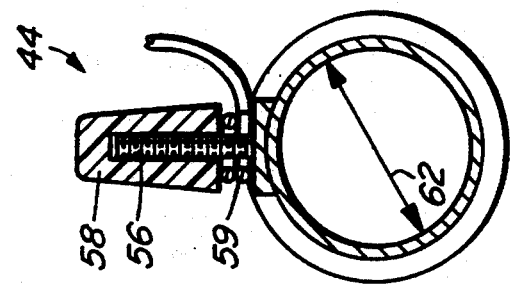
FIG. 4 is a simplified transverse section on Line 4—4 of FIG. 3.
Figure 3:
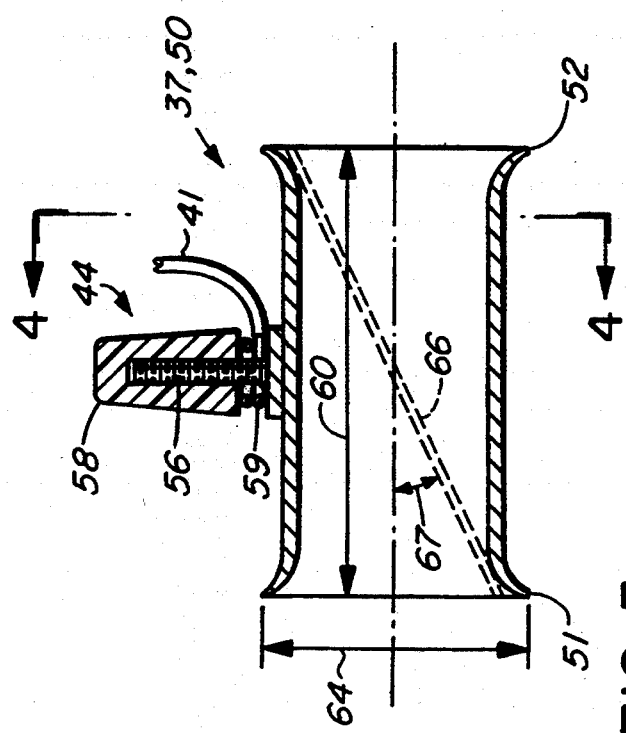
FIG. 3 is a longitudinal cross section through portions of the conducting member.
Figure 5:
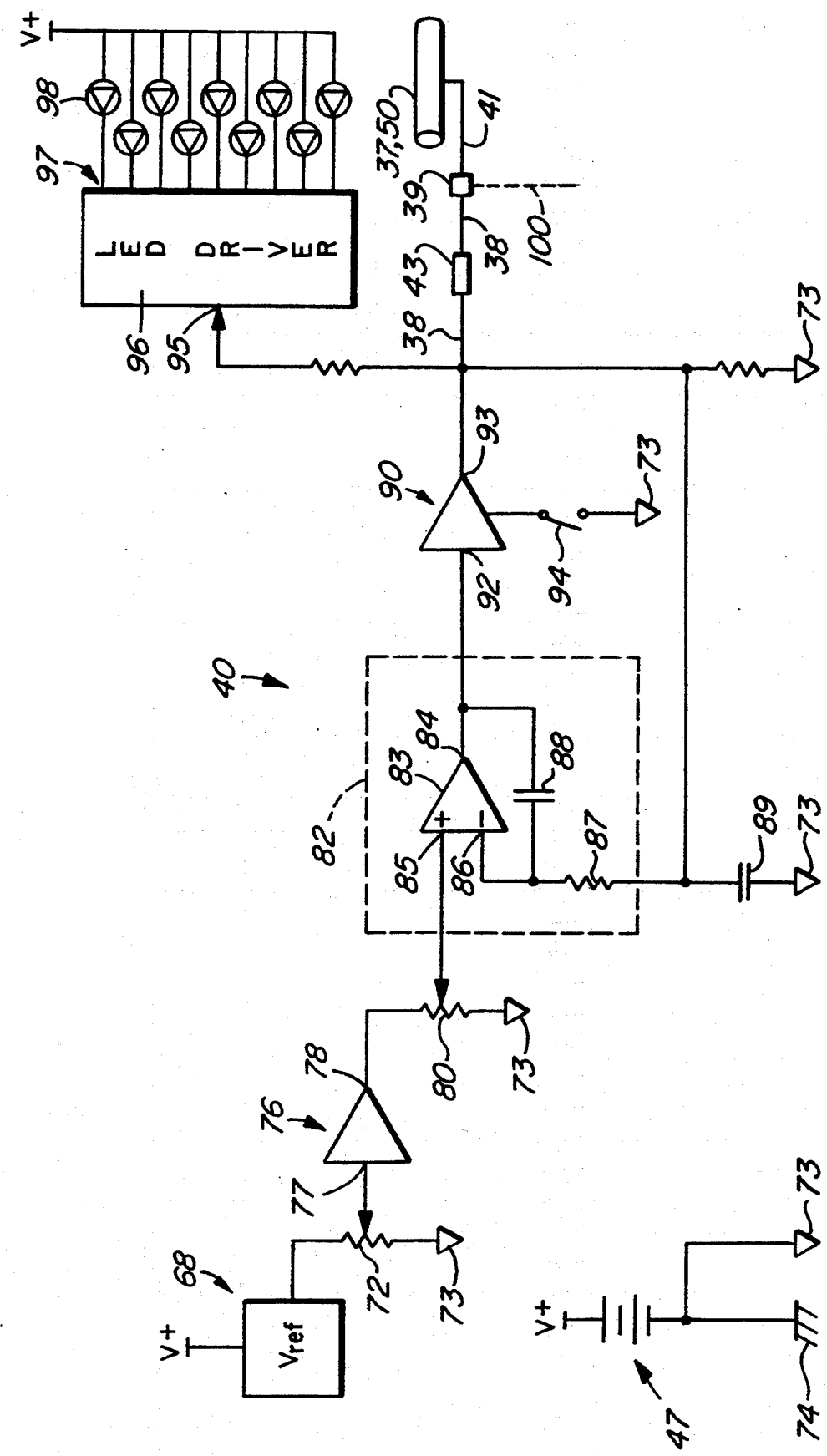
FIG. 5 is a simplified electrical schematic showing an electrical circuit controlling electrical voltage applied by the conducting member.

FIGS. 2 through 4

Referring to FIG. 2, a portion of the main electrical wire 41 adjacent the member 37 is a plastic insulated wire which is sufficiently strong to support weight of the conducting member 37 resting lightly on the wire line 23 as shown. An outer end of the main electrical wire 41 is connected with a releasable connector 44 to the conducting member 37 as will be described with reference to FIGS. 3 and 4. A pair of plastic cable ties 45 are spaced apart along the arm 19 and secure two portions of the main wire 41 to the bar to provide a simple and effective means of locating the conducting member 37 adjacent the arm 19 and the downrigger wire line 23. Thus, the electrical wire 41 is the main electrical conductor and mechanical support connected to the conducting member 37 and extending from a portion of the downrigger so as to locate the conducting member relative to the downrigger. While the bar of the downrigger is shown, other convenient locations could be selected. The output wire 38 extends from the apparatus 40 to a quick connect cable coupling 43 which also receives power from an electrical battery 47 and thus a power supply line, not shown, parallels a portion of the output wire 38 leading from the coupling 43 to the apparatus 40. A remaining portion of the wire 38 continues from the coupling 43 to the terminal 39 as shown. The quick connect cable coupling 43 enables the portions of the wire 38 to be separated easily to permit removal of the voltage control apparatus 35 when not required.

Referring to FIGS. 3 and 4, the conducting member 37 is a metal sleeve 50 having generally similar first and second ends 51 and 52 respectively. The sleeve has a relatively thin side wall of generally circular cross section, and outer ends of the side wall of the sleeve flare outwardly at the ends 51 and 52 to guide the downrigger wire line smoothly therethrough. When the apparatus is used with an electrical downrigger fitted with an automatic stop for stopping a motor of the downrigger, a stopper 54 is usually fixed to the wire line at a specific location, and is adapted to actuate an off switch which controls the downrigger motor. The stopper is a streamlined body and the flared ends of the sleeve are adapted to guide the stopper smoothly into the bore of the sleeve so as to prevent fouling with side wall edges at the ends of the sleeve. Sometimes line markers or splices are provided on the wire line, and these would also require guiding into the bore of the sleeve without fouling side wall edges at the ends of the sleeve. If an automatic stopper or line markers and the like are not used, it is still prudent to have the sleeve with flared ends to facilitate threading or initial feeding of the wire through the sleeve, and to reduce wear of the wire that might otherwise occur.

The releasable connector 44 comprises a threaded stem 56 secured to the side wall of the sleeve, for example by spot welding, and extending generally radially outwardly from the sleeve. A threaded cap 58, made of a suitable insulating material such as plastic, is threaded on the stem to secure a ring fitting 59 at the outer end of the main wire 41 against the stem to ensure good electrical connection with the sleeve.

The sleeve has an axial length 60, a minimum or inner diameter 62, and a maximum or outer diameter 64 as shown. As shown, ratio of the minimum or inner diameter 62 to the axial length 60 is approximately 1:2, but the range can be between 1:1 and 1:3. Ratio of the inner diameter 62 to the outer diameter 64 is approximately 1:1.3, although this can range between 1:1.1 to 1:1.5. The dimensions of the sleeve are selected to be as small as possible within the limits of easy threading of the downrigger wire line, carrying a stopper 54 if used, through the sleeve. It has been found that an inner diameter 62 of about 0.65 inches (17 mms), an outer diameter 64 of about 0.85 inches (22 mms) and a length 60 of about 1.5 inches (37 mms) is satisfactory for most applications. The minimum or inner diameter 62 is sufficient to facilitate initial threading of the wire line and to receive the automatic stopper 54 with negligible chance of inadvertent interference therewith.

FIG. 5

The voltage control apparatus 40 receives a positive voltage signal from the battery 47 as shown, the positive voltage of the battery being connected to a reference voltage circuit 68 which feeds into a first potentiometer 72 which is connected to signal ground 73. The negative terminal of the battery is connected also to signal ground 73, and a connection from the negative terminal of the battery is made to chassis ground 74. A buffer 76 has an input 77 connected to the potentiometer, and an output 78 connected to a second potentiometer 80 which is also connected to signal ground 73. An integrator circuit 82 has a linear amplifier 83 having a non-inverting input 85 and an inverting input 86, and an output 84, and also includes a capacitor 88 connected between the output and the inverting input 86. The integrator circuit further includes a resistor 87 and a capacitor 89 connected in series between the inverting input 86 and signal ground 73. The first potentiometer 72 provides a reference voltage of between 0 and 1.0 volts, serving as a coarse adjustment of voltage, and the second potentiometer 80 provides an output of between 0.5 and 0.9 volts, serving as a fine adjustment of voltage. The output of the integrator is a stable voltage accurate to within a few millivolts.

An output driver 90 has an input 92 and an output 93 and is enabled and disabled by an on/off switch 94. The output driver drives the output wire 38, the main electrical wire or conductor 41 and an input 95 of an LED driver 96 connected thereto. In this embodiment, the LED driver is operable to receive a signal at its input 95 and control a plurality of outputs 97 in response to the voltage of such signal such that an output is actuated in response to input voltage within a corresponding unique, pre-defined voltage range. The LED driver controls segments, shown generally at 98, of a bar graph display, the segments being illuminated as required to provide an accurate display of the voltage appearing at the conductor 41. In the particular example, the segments 98 can be used to display voltages at the output 93 from 0.5 to 0.9 volts D.C. positive, with an accuracy of 0.025 volts.

Clearly, voltage at the output 93 is transferred through the wires 38 and 41 and the cable coupling 43 and terminal 39 to the conducting member 37. A second main electrical wire 100, shown in broken outline, or more wires can extend from the terminal 39 to one or more conducting members, not shown, should the apparatus 35 be used to apply electrical potential to several downriggers.

OPERATION

Operation of the downrigger fishing rod and other conventional related equipment is unchanged by the present invention. When the downrigger is operating, the wire line 23 passes through the sleeve 50 and the sleeve rests lightly on the wire to ensure adequate electrical contact between the sleeve and the wire line. The voltage control apparatus 35 is connected to the battery 47, and the switch 94 is moved to the "off" position which sets the driver output 93 to a high impedance state. When the downrigger is at fishing depth, or at least a few feet under the surface, a voltage output will be displayed on the bar graph display to indicate the natural voltage of the wire line and associated structure in the water relative to a signal ground. If the natural voltage is not at the desired value, the apparatus 35 is turned on by closing the switch 94 and the fine adjustment potentiometer 80 is manually adjusted to obtain the desired line voltage as displayed by the bar graph display. If the natural voltage is higher than the upper value of the bar graph, the bar graph will indicate the maximum value, and if the natural voltage is lower than the minimum value, there is no reading of the natural voltage.

The recommended voltages for different species of fish are known to those skilled in the art, and fine adjustment of voltage usually is best found by trial and error. For a suggested starting point, it has been found that in salt water Chinook or King salmon are attracted by a voltage of approximately 0.6 volts, whereas Sockeye salmon are attracted by a voltage of approximately 0.75 volts. In fresh water, lake trout (Mackinaw) are attracted by approximately 0.65 volts, whereas black bass are attracted by approximately 0.75 volts.

Thus, to practice the invention, the contact portion of the conducting member has a voltage potential controllable accurately between approximately 0.5 and 0.9 volts DC for most fish species of interest, and preferably the voltage is selected and held to within an accuracy of about 0.025 volts.

To avoid erroneous readings, the sacrificial anodes on the boat and on the drive chain should be cleaned if they have a coating of slime or growth, or replaced if they are more than 50 per cent dissolved. Also, only pure lead or vinyl covered lead covered weights should be used, with an insulating or plastic hook to connect the weight to the line.

Thus, in summary, it can be seen that the broad method according to the invention comprises the steps of:
(a) passing the downrigger wire line through a conducting member having an opening to receive the downrigger wire line to pass freely therethrough,
(b) maintaining electrical contact between a contact portion of the conducting member and the downrigger wire line as the wire passes therethrough, and
(c) exposing the contact portion of the conducting member to an electrical voltage to control electrical potential of the downrigger wire line.

ALTERNATIVES

The sleeve 50 is shown as having a side wall forming a closed loop which fully encloses the downrigger wire line. This requires threading of the downrigger wire line 23 through the sleeve to set up the apparatus. To eliminate the need to thread the wire line through the sleeve, a narrow slit 66, slightly wider than the wire line and shown in broken outline in FIG. 3, can be provided in the sleeve which permits the wire line to be passed generally transversely through the slit into the sleeve. To reduce chances of the wire passing inadvertently outwardly through the slit, the slit is preferably inclined obliquely at an angle 67 to the axis of the sleeve, which angle can be generally between 20 and 40 degrees. It has been found that running the slit obliquely from opposite sides at opposite ends of the sleeve ensures that the slit is displaced sufficiently obliquely to prevent inadvertent passing of the wire line outwardly through the slit. In this alternative, it can be seen that the conducting member is a sleeve having an axially elongated side wall which at least partially encloses the downrigger wire line.

The sleeve is shown to be made from stainless steel, which is an electrically conducting material which provides a rugged conducting member in which electrical contact can be made at any point on the sleeve. In addition, the sleeve is corrosion resistant and tough, and can resist wear from the wire line passing thereacross, often at relatively high speed. In an alternative arrangement, if the sleeve is shaped and located so that the wire always contacts the sleeve in essentially the same place, which can be termed a contact portion, it would be necessary only to make the contact portion of conducting material, while the remainder of the sleeve could be of a non-conducting material. In this alternative, the conducting member would have at least a contact portion which is electrically conducting and which contacts the downrigger wire line to provide electrical contact therewith. Clearly, the contact portion would have a connection equivalent to the connection 44 so to be electrically connectable to the electrical voltage source to control the electrical potential of the downrigger wire line. The releasable connector 44 in this instance would then be connected to contact portion of the conducting member to receive the electrical conductor or wire 41 to provide the electrical potential.

It is claimed:
1. An apparatus for controlling electrical potential of a downrigger wire line, the apparatus comprising:
(a) a conducting member having an opening to receive the downrigger wire line to permit the wire line to pass freely therethrough, the conducting member having at least a contact portion which is electrically conducting and which contacts the downrigger wire line to provide electrical contact therewith, the contact portion being electrically connectable to an electrical voltage source to provide an electrical potential to the downrigger wire line.

2. An apparatus as claimed in claim 1, further including:
(a) a releasable connector connected to the contact portion of the conducting member to receive a main electrical conductor to provide the electrical potential.

3. An apparatus as claimed in claim 1, in which:
(a) the conducting member is made from a corrosion resistant, electrically conducting material.

4. An apparatus as claimed in claim 1, in which:
(a) the conducting member is a sleeve having an axially elongated side wall which at least partially encloses the downrigger wire line.

5. An apparatus as claimed in claim 4, in which
(a) the side wall of the sleeve forms a closed loop to fully enclose the wire, and
(b) the sleeve is made from a corrosion resistant electrically conducting material.

6. An apparatus as claimed in claim 4, in which:
(a) the sleeve has a generally circular cross section.

7. An apparatus as claimed in claim 4, in which:
(a) the side wall of the sleeve flares outwardly at both ends thereof to smoothly guide the downrigger wire and associated structure therethrough.

8. An apparatus as claimed in claim 6, in which:
(a) the side wall of the sleeve flares outwardly at both ends thereof to smoothly conducting the downrigger wire line therethrough.

9. An apparatus as claimed in claim 1, in which:
(a) the conducting member is connectable to a portion of the downrigger.

10. An apparatus as claimed in claim 9, further including:
(a) a main electrical conductor connected to the contact portion of the conducting member and extending from the portion of the downrigger so as to locate the conducting member relative to the downrigger.

11. An apparatus as claimed in claim 10, in which:
(a) the main electrical conductor is secured to an arm of the downrigger, and
(b) the conducting member is connected to an end of the main electrical conductor and is partially supported and located by the main conductor and the arm, so that the conducting member extends closely adjacent the arm and receives a portion of the downrigger wire line passing closely adjacent the arm.

12. An apparatus as claimed in claim 1, further including:
(a) an electrical potential controller having a positive D.C. voltage output which is controllable to an accuracy of about 0.025 volts, and
(b) a main electrical conductor extending from the output of the electrical charging means to the contact portion of the conducting member.

13. An apparatus as claimed in claim 12, in which:
(a) the electrical potential controller has an output control which permits adjustment of the output voltage to be between approximately 0.5 and 0.9 volts DC positive.

14. An apparatus as claimed in claim 1, in which:
(a) the conducting member has a slit to receive the downrigger wire line to facilitate passing the wire line into and out from the conducting member.

15. A method of controlling electrical potential of a downrigger wire line, the method comprising the steps of:
(a) passing the downrigger wire line through a conducting member having an opening to receive the downrigger wire line to pass freely therethrough,
(b) maintaining electrical contact between a contact portion of the conducting member and the downrigger wire line as the wire line passes therethrough, and
(c) exposing the contact portion of the conducting member to an electrical voltage to control electrical potential of the downrigger wire line.

16. A method as claimed in claim 15, further characterized by:
(a) releasably connecting a main electrical conductor to the contact portion to provide an electrical potential to the downrigger wire line.

17. A method as claimed in claim 16, further characterized by:
(a) providing the conducting member with an axially elongated side wall to define a sleeve which at least partially encloses the downrigger wire line.

18. A method as claimed in claim 17, further characterized by:
(a) passing the downrigger wire line through ends of the sleeve which are flared outwardly so as to ensure smooth passage of the wire line through the sleeve.

19. A method as claimed in claim 15, further characterized by:
(a) connecting a main electrical conductor to the contact portion of the conducting member to control electrical potential of the contact portion, and
(b) securing a portion of the main electrical conductor to a portion of the downrigger so that the conducting member is partially located by the electrical conductor and receives a portion of the downrigger wire line passing closely adjacent the arm.

20. A method as claimed in claim 15, further characterized by:
(a) maintaining the contact portion at a voltage of between approximately 0.5 to 0.9 volts DC positive.

21. A method as claimed in claim 20, further characterized by:
(a) selecting voltage applied to the contact portion to be within an accuracy of about 0.025 volts.

* * * * *